(12) United States Patent
Wickremesinghe et al.

(10) Patent No.: US 10,049,022 B2
(45) Date of Patent: Aug. 14, 2018

(54) SYSTEMS AND METHODS TO RETAIN AND RECLAIM RESOURCE LOCKS AND CLIENT STATES AFTER SERVER FAILURES

(71) Applicant: Oracle International Corporation, Redwood Shores, CA (US)

(72) Inventors: Rajiv Gamani Wickremesinghe, San Francisco, CA (US); Harish Nandyala, Fremont, CA (US); Prasad V. Bagal, Saratoga, CA (US); Richard Lawrence Long, Menlo Park, CA (US); Shie-rei Huang, Saratoga, CA (US); Dungara Ram Choudhary, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 13/925,726

(22) Filed: Jun. 24, 2013

(65) Prior Publication Data
US 2014/0379645 A1  Dec. 25, 2014

(51) Int. Cl.
*G06F 17/30* (2006.01)
*G06F 11/20* (2006.01)

(52) U.S. Cl.
CPC ........ *G06F 11/203* (2013.01); *G06F 11/2041* (2013.01); *G06F 11/2097* (2013.01); *G06F 2201/80* (2013.01); *G06F 2201/825* (2013.01)

(58) Field of Classification Search
CPC ......... G06F 17/30578; G06F 17/30171; G06F 17/30289; G06F 17/30371; G06F 17/30174; G06F 17/30286; G06F 17/30362; G06F 17/30575; G06F 17/30194; G06F 17/30067; G06F 17/30203; G06F 17/30215; G06F 17/30312
See application file for complete search history.

(56) References Cited

U.S. PATENT DOCUMENTS

| 6,061,334 | A  | * | 5/2000 | Berlovitch | ............. H04L 12/46 370/255 |
| 6,341,340 | B1 | * | 1/2002 | Tsukerman  | ....... G06F 17/30575 707/E17.007 |
| 6,539,381 | B1 | * | 3/2003 | Prasad     | ............. G06F 17/30575 707/999.01 |

(Continued)

*Primary Examiner* — Ashish K Thomas
*Assistant Examiner* — Rezwanul Mahmood
(74) *Attorney, Agent, or Firm* — Vista IP Law Group, LLP

(57) ABSTRACT

A method, system, and computer program for high-availability database systems. The method commences by replicating (e.g., from a first server to a second server) a data structure having entries describing resource locks and client states. The replication can be performed to any number of servers. Upon detecting a failure of a connection between the first server and a client to which the first server is connected, the system establishes a new connection between the second server and the client by updating the replicated data structure to describe new connection between the second server and the client and updating the entries of the replicated data structure to reflect the new connection and the then current aspects of the resource locks and client states. The client can be a database instance, and the act of replicating can be accomplished using a broadcast channel. The servers can be organized in a computing cluster.

20 Claims, 10 Drawing Sheets

(56) References Cited

U.S. PATENT DOCUMENTS

| | | | |
|---|---|---|---|
| 7,072,911 B1* | 7/2006 | Doman | G06F 17/30575 |
| | | | 707/615 |
| 7,249,314 B2* | 7/2007 | Walker | G06F 17/24 |
| | | | 715/205 |
| 7,290,015 B1* | 10/2007 | Singhal | G06F 11/2097 |
| | | | 707/999.201 |
| 7,805,503 B2 | 9/2010 | Bagal | |
| 7,913,050 B2 | 3/2011 | Bagal et al. | |
| 8,046,446 B1* | 10/2011 | Karr | H04L 67/1097 |
| | | | 709/223 |
| 8,140,806 B2 | 3/2012 | Vingralek et al. | |
| 8,156,304 B2 | 4/2012 | Friedman et al. | |
| 8,392,915 B2 | 3/2013 | Friedman et al. | |
| 8,701,110 B2 | 4/2014 | Friedman et al. | |
| 8,732,521 B2 | 5/2014 | Joshi et al. | |
| 8,856,583 B1* | 10/2014 | Visser | G06F 11/20 |
| | | | 714/4.11 |
| 8,924,951 B2 | 12/2014 | Bagal et al. | |
| 8,949,471 B2* | 2/2015 | Hall | H04L 29/06 |
| | | | 709/250 |
| 9,569,517 B1* | 2/2017 | Smola | G06F 17/30575 |
| 9,639,553 B2* | 5/2017 | Hall | G06F 17/30174 |
| 9,712,427 B1* | 7/2017 | Pittman | H04L 67/1097 |
| 2001/0039550 A1* | 11/2001 | Putzolu | G06F 17/30575 |
| | | | 707/999.009 |
| 2003/0018719 A1* | 1/2003 | Ruths | G06F 9/52 |
| | | | 709/205 |
| 2004/0044744 A1* | 3/2004 | Grosner | H04L 29/06 |
| | | | 709/217 |
| 2004/0122961 A1* | 6/2004 | Rouault | H04L 41/06 |
| | | | 709/229 |
| 2004/0255048 A1* | 12/2004 | Lev Ran | G06F 9/546 |
| | | | 707/E17.01 |
| 2005/0033822 A1* | 2/2005 | Grayson | G06F 17/30194 |
| | | | 707/E17.032 |
| 2006/0101081 A1* | 5/2006 | Lin | G06F 17/30362 |
| | | | 707/999.2 |
| 2006/0212453 A1* | 9/2006 | Eshel | G06F 11/2025 |
| | | | 707/999.01 |
| 2007/0016663 A1* | 1/2007 | Weis | G06F 11/2028 |
| | | | 709/223 |
| 2008/0243847 A1* | 10/2008 | Rasmussen | G06F 17/30171 |
| | | | 707/999.008 |
| 2009/0175591 A1* | 7/2009 | Gondhalekar | H04N 21/23617 |
| | | | 386/291 |
| 2009/0254750 A1* | 10/2009 | Bono | H04L 63/0428 |
| | | | 713/170 |
| 2010/0094953 A1* | 4/2010 | Kwon | H04L 67/104 |
| | | | 709/219 |
| 2011/0265117 A1* | 10/2011 | Cha | H04H 60/32 |
| | | | 725/35 |
| 2012/0066394 A1* | 3/2012 | Revanuru | G06F 17/30286 |
| | | | 709/226 |
| 2012/0151249 A1* | 6/2012 | Swan | G06F 11/1443 |
| | | | 707/827 |
| 2012/0159094 A1 | 6/2012 | Bridge, Jr. et al. | |
| 2012/0179797 A1* | 7/2012 | Sharma | H04L 41/0806 |
| | | | 709/223 |
| 2013/0086018 A1* | 4/2013 | Horii | G06F 17/30371 |
| | | | 707/703 |
| 2013/0110937 A1* | 5/2013 | Burns | G06Q 10/103 |
| | | | 709/205 |
| 2013/0298154 A1* | 11/2013 | Panigrahi | H04L 65/4084 |
| | | | 725/28 |
| 2014/0188819 A1 | 7/2014 | Bagal et al. | |
| 2014/0250323 A1 | 9/2014 | Joshi et al. | |
| 2014/0376362 A1 | 12/2014 | Selvaraj et al. | |
| 2014/0379645 A1* | 12/2014 | Wickremesinghe | G06F 11/203 |
| | | | 707/624 |
| 2015/0032691 A1* | 1/2015 | Hall | H04L 29/06 |
| | | | 707/610 |
| 2015/0039557 A1* | 2/2015 | Howard | G06F 17/30174 |
| | | | 707/617 |

* cited by examiner

| Connection and Endpoints | | LU | Locks/Modes | States |
|---|---|---|---|---|
| Client01 | Server01 | $C_{A1}$ | {L0101DF, L0101FS} | {S1} |
| Client02 | Server01 | $C_{B1}$ | {L0102DF} | {S2} |
| Client01 | Server02 | $C_{C2}$ | | |
| Client01 | Server01 | $C_{D1}$ | {L0101FP} | {S3} |
| Client01 | Server01 | $C_{E1}$ | {L0101LS} | {S4} |

SYSTEMS AND METHODS TO RETAIN AND RECLAIM RESOURCE LOCKS AND CLIENT STATES AFTER SERVER FAILURES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of high-availability database systems and more particularly to techniques for retaining and reclaiming resource locks and client states after one or more server failures.

BACKGROUND

In environments that rely on highly-available database access, often a single database instance is accessed by multiple servers over some form of a network, and any one or more of the multiple servers establishes network connections with the database instance. Such a connection is then used to communicate data and control information to and from the database instance and the servers. In the situation where there are multiple servers (e.g., providing services for a payroll application, or providing services for an accounts payable application, etc.), the multiple servers access a single database instance. In such a case, some form of access control (e.g., locks, semaphores) is implemented so as to avoid access collisions (e.g., two servers unknowingly writing to the same database table row at the same time). During ongoing operation, it is possible that one or more of the servers crashes, or it is possible that certain functional components hosted on the one or more of the servers (e.g., their communication connections) experience a crash or other failure.

In legacy implementations of high-availability database systems, only certain failures are deemed recoverable. For example, some legacy systems attempt a (partial) recovery when a connection is lost by merely relying on a client to establish a new connection to replace a failed connection. Such legacy techniques are deficient in at least the regard that in modern database systems, more than one connection (each of which has particular characteristics) might be in use at any moment in time, and legacy techniques do not have the capabilities to manage multiple connections. Further, legacy techniques are deficient in at least the regard that a failure might come in the form of a failed server (e.g., together with any/all services of the failed server, including use of any number of connections), and the legacy implementations have no way of recovering in the event of a failed connection due to a failed server.

Worse, in modern high-availability database system, the existence and configuration of the aforementioned form (or forms) of access control (e.g., locks, semaphores) might be complex (e.g., at a fine-grained level of access), and reclaiming extensive state might need to occur quickly, and with a high degree of fidelity. Legacy techniques are deficient. Still worse, it can sometimes occur that a plurality of servers (and constituent connections) suffer concurrent or nearly concurrent failures (e.g., in a rack/blade situation), and legacy techniques do not address this situation at all, or are inadequate to recover quickly and with a high degree of fidelity with respect to the system as a whole just prior to the failure or failures. Moreover, none of the aforementioned technologies have the capabilities to perform the herein-disclosed techniques for retaining and reclaiming resource locks and client states after one or more server failures. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for retaining and reclaiming resource locks and client states after one or more server failures.

Some method embodiments commence by replicating (e.g., copying or broadcasting from a first server to a second server, and/or a third server, and/or an Nth server) a data structure having entries describing resource locks and client states. The servers operate normally, periodically updating the data structure. One or more servers or an agent can detect a server failure or interruption (e.g., a failure or interruption of the connection between the first server and a client), and the system establishes a new connection between the second server and the client by updating the replicated data structure to describe the new connection between the second server and the client, and then updating the entries of the replicated data structure to reflect (i) the new connection as well as (ii) the then current aspects of the resource locks and client states. The client can be a database instance, and the act of replicating can be accomplished using a broadcast channel. The servers can be organized in a computing cluster, and the agent can be implemented on any computational unit in the cluster.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3A depicts a sample data structure used in systems for retaining and reclaiming resource locks and client states after one or more server failures, according to some embodiments.

DETAILED DESCRIPTION

Figure 1A:
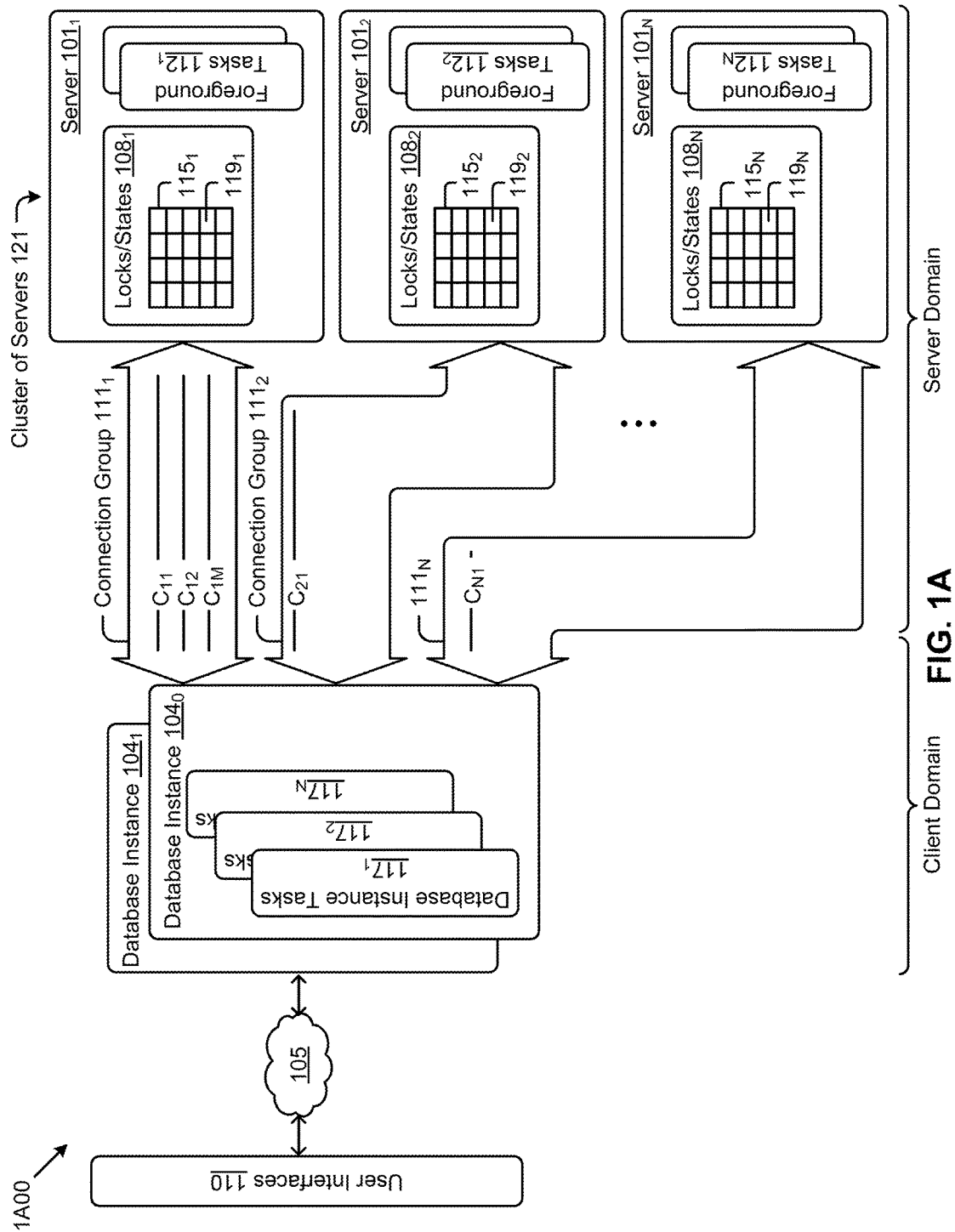
FIG. 1A depicts an environment comprising functional units involved in retaining and reclaiming resource locks and client states after one or more server failures, according to some embodiments.

Some embodiments of the present disclosure address the problem of failover in an enterprise database system and some embodiments are directed to an improved approach for implementing retaining and reclaiming resource locks and client states after one or more server failures. More particularly, disclosed herein and in the accompanying figures are exemplary environments, methods, and systems for retaining, and reclaiming resource locks and client states after one or more server failures.

Overview

In environments that rely on high-availability database access, often a single database instance is accessed by multiple servers over some form of a network, and any one or more of the multiple servers establishes network connections with the database instance. Such a connection is then used to communicate data and control information to and from the database instance and the servers. In the situation where there are multiple servers accessing a single database instance, some form of access control (e.g., locks, semaphores) is implemented so as to avoid access collisions (e.g., two servers unknowingly writing to the same database table row at the same time). Indeed, in the situation where user applications are performing I/O to and from a shared storage system (e.g., a database instance) which is managed by a group of servers, a failure of the particular server to which the client is connected causes user applications to degrade (or fail).

Disclosed herein are techniques such that in the event of a server failure (e.g., a failure to provide access services), the connected database instances survive the server failure and continue to function—even during reclaiming and reconnecting operations. In order to accomplish this, some techniques need to be in place such that resources allocated (e.g., locks), and/or privileges granted (e.g., states or access provided by the locks) can persist through the failure event, and through reclaiming and reconnecting operations. The herein disclosed techniques for lock management provide for honoring locks especially in the situation of a lock that was initially allocated by a later-failed server. More particularly, the lock management techniques honor locks based on portions of lock allocation and status as is preserved in redundant data structures.

In situations where the (failed) server had connections to the shared storage system, those connections need to be transparently reestablished (e.g., by creating new connections and/or sessions on a surviving server). In some cases a server may have been acting as a repository for state variables, which state variables augment the aforementioned privileges granted and/or resources allocated, and those state variables need to be reconstructed on a replacement server. The reconstructed state variables need to be re-associated with the original requestor. As earlier indicated, a particular server might manage a large number of privileges granted, resources allocated, and connections established (and other state variables); therefore a comprehensive technique is needed to maintain the fidelity of the system even after reconstruction. Accordingly, techniques and systems are herein-below disclosed, which implement reconstruction of connections, locks, states and so on after a detected (or intentional) server interruption.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions Of Exemplary Embodiments

FIG. 1A depicts an environment 1A00 comprising functional units involved in retaining and reclaiming resource locks and client states after one or more server failures.

As shown, enterprise applications are accessed by users utilizing user interfaces (e.g., the shown user interfaces 110). Some (or all) of the functions of any one or more of these enterprise applications are hosted on one or more database instances. Application-specific functionality is provided by user interface applications or user application services or middleware interfaces (e.g., database instance tasks $117_1$, database instance tasks $117_2$, database instance tasks $117_N$).

Any database instance can be supported by one or more processes that provide access services, which processes might be hosted on one or more nodes in a cluster of servers 121 (e.g., comprising server $101_1$, server $101_2$, server $101_N$, etc.) and any such server can host any number of foreground tasks (e.g., foreground tasks $112_1$, foreground tasks $112_2$, foreground tasks $112_N$). Any of the foreground tasks may access data in its respective server, and/or can access a database instance (e.g., database instance $104_0$, database instance $104_1$) for which there is a connection. Any of the database instance tasks may access data locally from its respective database instance (e.g., database instance $104_0$, database instance $104_1$), and/or can access data from a server (e.g., server $101_1$, server $101_2$, server $101_N$, etc.) for which there is a connection. Access (either local access or remote access) can be granted (or can be denied) in accordance with a variety of access modes and privileges (e.g., READ access, READ/WRITE access, etc.). Communications between the server(s) and database instance(s) is facilitated by one or more connections between a server and the database. For example, server $101_1$ uses a set of connections labeled as "$C_{11}$", "$C_{12}$", etc. Additional connections (through "$C_{1M}$") are established as needed, and can be considered as a related group of connections (e.g., the connection group $111_1$, connection group $111_2$, connection group $111_N$, etc.). The number of individual connections within a connection can be small such as is depicted in FIG. 1A as connection group $111_2$, (e.g., comprising connection $C_{21}$) or connection group $111_N$ (e.g., comprising connection $C_{N1}$) or a connection group may be somewhat larger (e.g., as depicted in FIG. 1A as connection group $111_1$), or may be very large.

The aforementioned user interfaces 110 may access any one or more of the database instances or servers via one or more instances of a physical network component (e.g., network 105). Implementation of a network can support point-to-point communications (e.g., as shown) or the network can support any-node-to-any-node communications (e.g., as in a packet switching network). Further, any one or more of the servers (e.g., server $101_1$, server $101_2$, server $101_N$, etc.) can communicate with any other one or more of the servers using facilities of network 105. The connections (e.g., of any of the connection groups) may use the facilities of network 105, or may use the resources of a different network.

The operating conditions of a server and/or its connections can be maintained in a data structure (e.g., datastructure $115_1$, datastructure $115_2$, datastructure $115_N$, etc.). Such a data structure can contain entries, which in turn contain information as to operating conditions of a server and/or its connections (e.g., connection endpoints, connection modes, lock conditions, operating states, connection states, etc.). As shown, any server can define and maintain the server's own data structure within the server's allocated memory area. The operating conditions may comprise information regarding resource allocations (e.g., locks) and/or connection states (e.g., connection state $119_1$, connection state $119_2$, connection state $119_N$, etc.) and/or operating modes. The aforementioned data structure is merely one possible way for operating conditions to be maintained by a server, and any known-in-the-art techniques can be employed to maintain such operating conditions, and the storage extent of the shown data structure can be extended to include additional data (e.g., see locks/states $108_1$, locks/states $108_2$, locks/states $108_N$, etc.). The persistence of the entries corresponding to information as to the full extent of operating conditions of a server can be semi-volatile (e.g., within RAM memory) or can be more non-volatile (e.g., within FLASH memory). Some portions of entries corresponding to information as to operating conditions of a server can be stored in persistent non-volatile storage such as in/on magnetic media (e.g., a hard disk drive).

The database instance tasks can perform various services, for example database instance tasks can perform a user foreground tasks, or a background task, or can be a slave process under control or direction of any other process in environment 1A00.

As can be seen from the organization as shown within environment 1A00, if a server fails, its connections also fail, and some or all of the operating conditions are lost. For example, if a server fails, the server's RAM memory cannot be reliably accessed, and/or the server's HDD media cannot be reliably accessed.

Figure 1B:
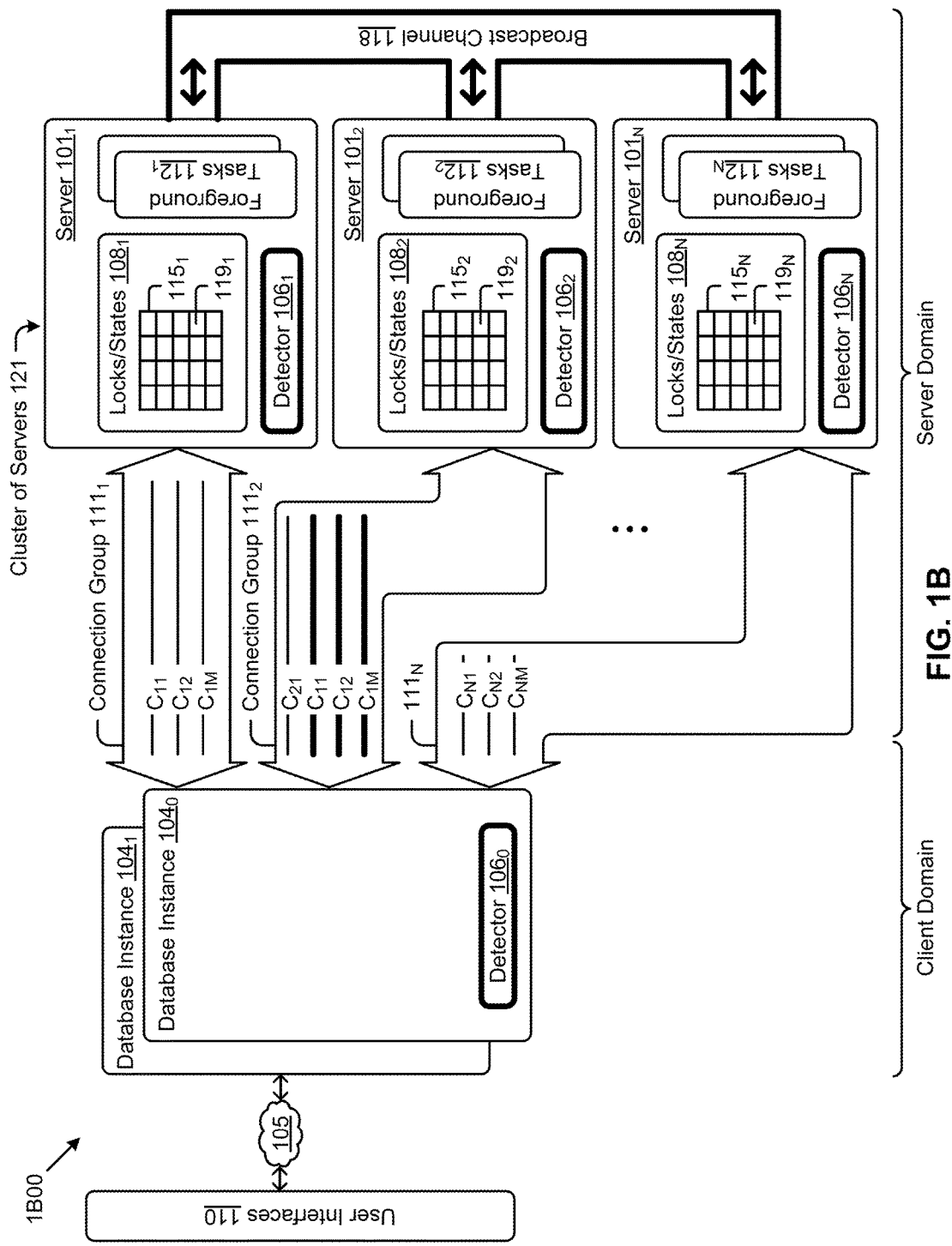
FIG. 1B depicts an environment showing connections and states of functional units as used for retaining and reclaiming resource locks and client states after one or more server failures, according to some embodiments.

For the purposes of retaining and reclaiming operating conditions (e.g., resource locks and client states after one or more server failures), an architecture such as is shown in FIG. 1B is defined, and is presently discussed.

FIG. 1B depicts an environment 1B00 showing connections and states of functional units as used for retaining and reclaiming resource locks and client states after one or more server failures. As an option, the present environment 1B00 may implement some or all of the architecture and functionality of the embodiments described herein.

For implementing embodiments of a system for retaining and reclaiming resource locks and client states after one or more server failures, the following actions and implementation concepts are introduced:

Replication: Various disclosed techniques serve for replicating a data structure and/or variants comprising resource locks and client states. Replication can occur from a first server to another server, or replication can be broadcast from a particular server to any/all other servers in the environment.

Detection: The failure of a server can be detected through various means. In some cases false failures (e.g., a merely slow server, but not a failed server) are classified as a transient or other non-failure observation, and do not raise recovery events.

Reconnection: A connection that had been in operation to/from a failed server can be reestablished at a replacement server. When the characteristics of a connection are maintained as disclosed herein, a replacement connection can be established, which replacement connection exhibits substantially the same function of the connection as was provided by the connection before the detected failure.

Updating: Even given the provisions of the aforementioned reconnection, time might have passed since the actual point of failure (e.g., which might be at an earlier point in time than detection of the failure) and resources might have completed an earlier-assigned task, and/or an allocation might have expired, etc. Accordingly, a data structure (e.g., a replicated data structure) and/or any extent of information regarding the locks and states might need to be updated to reflect a reclaimed lock state or a renewed state.

Clean-Up: A well-behaved server can detect when an aspect of the data structure (e.g., allocated memory) and/or any extent of information regarding the locks and states might need to be cleaned up. For example, a well-behaved server might detect that a lock has expired, and might return any allocated memory to the memory pool. Or, a well-behaved server might detect that an agent at one end of a connection is no longer maintaining a connection, and might determine that the connection should be given up.

FIG. 1B introduces additional structure to the environment of FIG. 1A. Specifically, detector modules are introduced (see detector $106_0$, detector $106_1$, detector $106_2$, detector $106_N$, etc.). A detector module can be hosted and started in any/all computational elements within the environment, or even within any/all computational elements that can merely access the environment. As shown, a detector module is deployed at several computational units. This provides an aspect of redundancy, namely that even if one or more servers fails, there remain other computational elements that can detect and identify the failed servers.

FIG. 1B also introduces a channel for broadcasting (e.g., broadcast channel 118). Such a channel can be implemented using components of network 105, or can use a backplane, or any other known-in-the art techniques for communicating between computational elements in a computing environment. In the context of the architecture and functionality for retaining and reclaiming resource locks and client states after one or more server failures, the broadcast channel can be used to broadcast changes to the data structures and/or the locks/states. That is, any single change to an operating condition at a particular server can be replicated at any/all of the other servers on the broadcast channel. Accordingly the data structure at any server will comprise all or nearly all of the locks/states of all of the other servers on the broadcast channel. Further, the data structure at any server will comprise all or nearly all of the operating conditions of the connections attached to the other servers on the broadcast channel. As such, a server has access to sufficient information about locks/states such that the server can determine to migrate locks/states, and/or can infer information about locks/states, and/or can reconstruct sufficient information about locks/states such that the server can take over for a failed server.

Figure 1C:
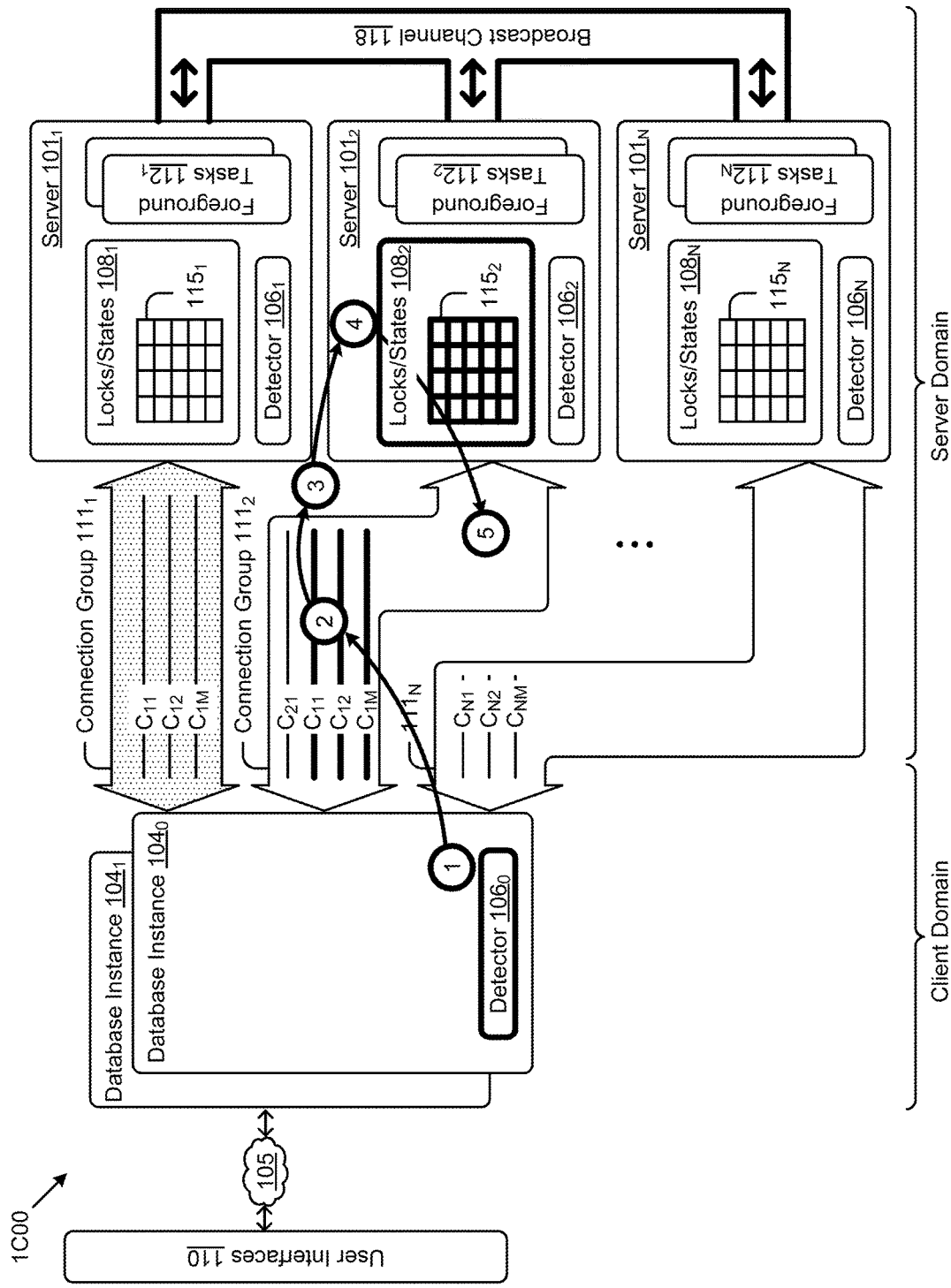
FIG. 1C shows a sample sequence of operations for retaining and reclaiming resource locks and client states after one or more server failures, according to some embodiments.

FIG. 1C shows a sample sequence 1C00 of operations for retaining and reclaiming resource locks and client states after one or more server failures. As an option, the present sample sequence 1C00 may be implemented in the context of the architecture and functionality of the embodiments described herein. Also, the sample sequence 1C00 or any aspect therein may be implemented in any desired environment.

The operations for retaining and reclaiming resource locks and client states after one or more server failures includes broadcasting the contents of a data structure (and changes to the data structure) to other servers in the environment. The replicated data structure comprises entries describing resource locks and client states, which entries are broadcast from a first server (e.g., server $101_1$) to at least one second server (e.g., to the server $101_2$ and to the server $101_N$ as shown).

The shown sequence commences when a detection module detects a failure of a connection between a first server and a corresponding client (see bubble 1). In the embodiment shown, the specific detection module is the detector $106_0$, however any detector can serve to detect and deem a server (or its connections) to have failed.

When the server is deemed to have failed, in this case the server being server $101_1$, then the connections (e.g., $C_{11}$, $C_{12}$, $C_{1M}$) that were used by the failed server are reestablished (see bubble 2) to a replacement server. As shown, the replacement server is server $101_2$.

In some cases a server might have a connection to a "primary" database instance (see bubble 3) as well as one or more connections to any "standby" database instances. In such a case, reconnections might be sequenced so as to connect to a primary database first, and then subsequently connect to any standby database instances (see bubble 5).

After reestablishment of the connections from the failed server to the replacement server (see bubble 2), the entries describing connections and resource locks and client states are updated to reflect the then current operating conditions (see bubble 4).

Figure 2:
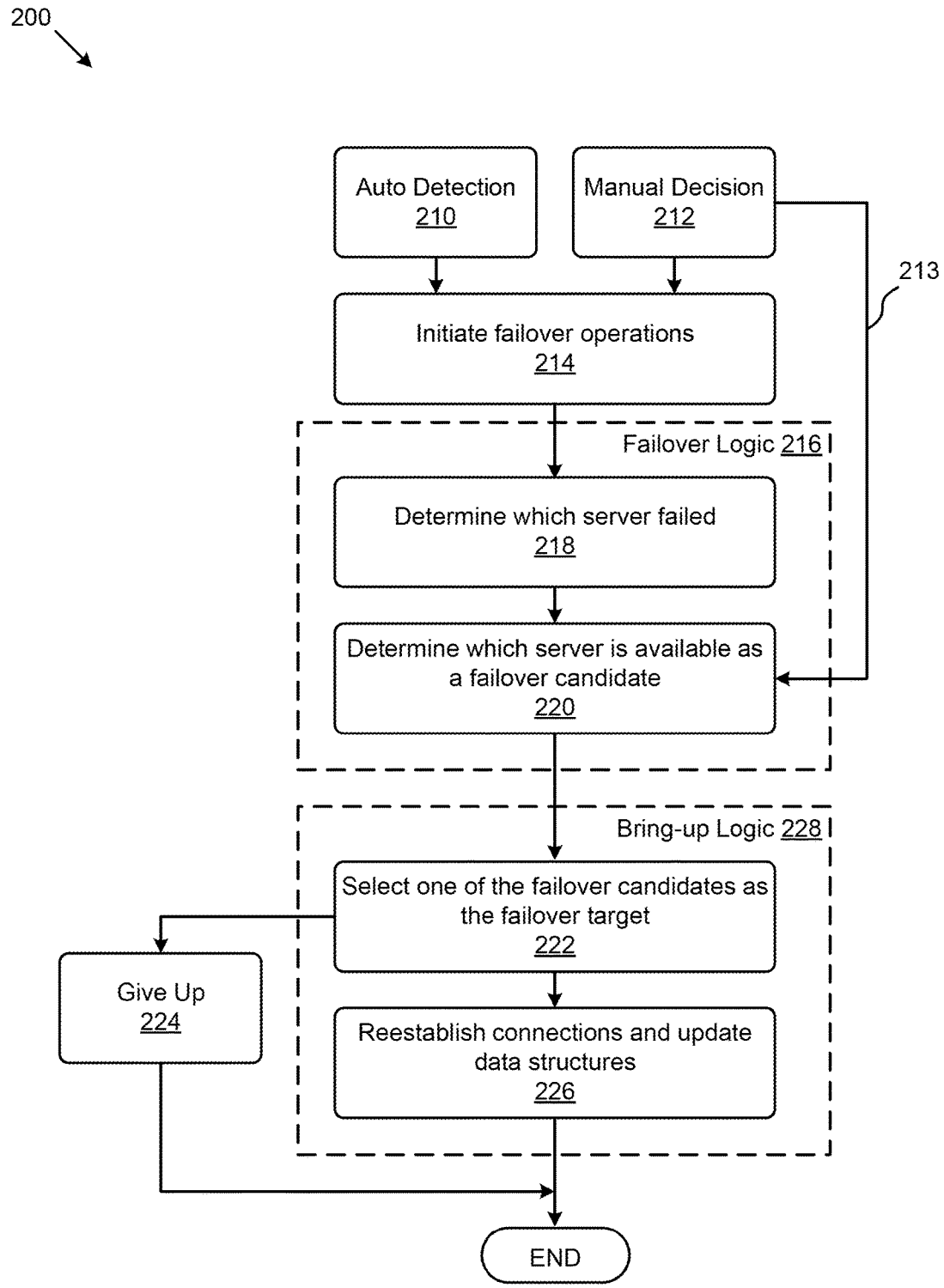
FIG. 2 is a flow diagram depicting a sample partitioning of operations for retaining and reclaiming resource locks and client states after one or more server failures, according to some embodiments.

FIG. 2 is a flow diagram 200 depicting a sample partitioning of operations for retaining and reclaiming resource locks and client states after one or more server failures. As an option, the present flow diagram 200 may be implemented in the context of the architecture and functionality of the embodiments described herein. Also, the flow diagram 200 or any aspect therein may be implemented in any desired environment.

The flow diagram 200 depicts two entry points, shown as auto detection 210 and manual detection 212. As can be understood, the techniques for retaining and reclaiming resource locks and client states can be practiced regardless if a server fails unexpectedly during operation, or if a server is intended to be deemed as a failed server, for example if a server is to be taken down for maintenance. In either case of entry through auto detection 210 or manual detection 212, the depicted failover operations (e.g., see initiate failover operations, operation 214) can begin.

Failover logic 216 can comprise a step to determine which server failed (see operation 218) and/or to determine which server is available to handle the load of the failed server (see operation 220). In the case that there is a manual decision to take down a server, the identification of that server can be provided to operation 220 (e.g., via path 213) such that the identified particular server is deemed as the failed server, and thus, its load can be migrated to a replacement server. In other cases, sub-steps within failover logic determine which server or servers are available as a failover candidate (see operation 220).

In addition to failover logic sub-steps, flow diagram 200 depicts sub-steps for bring-up logic 228. The bring-up logic includes an operation to select one of the failover candidates, and to deem a selected one of the failover candidates as a failover target (see operation 222). It can happen for various reasons that there is no suitable failover target (see FIG. 4). In such a case the bring-up logic might exit with an unsuccessful or "give-up" indication (see operation 224) and the flow diagram 200 ends.

The flow diagram 200 depicts merely one possible approach to failover and bring-up. Other approaches are possible, some of which are further discussed in FIG. 4 and FIG. 5, below.

Now, for implementing portions of the aforementioned bring-up logic in particular, the operation to reestablish connections (see operation 226) a data structure is used. Such a data structure is maintained by a set of servers (some or all which can be failover candidates), and ongoing changes to such a data structure are broadcast. Aspects of a sample data structure and the manner of making changes to it are discussed in FIG. 3A and FIG. 3B, as follows.

FIG. 3A depicts a sample data structure 3A00 used in systems for retaining and reclaiming resource locks and client states after one or more server failures. As an option, the present data structure 3A00 may be implemented in the context of the architecture and functionality of the embodiments described herein. Also, the data structure 3A00 or any aspect therein may be implemented in any desired environment.

As shown, the sample data structure depicts entries comprising connection endpoints (see "Connection Endpoints"), a logical unit identifier (see column "LU"), a description of locks and lock modes (see column "Locks/Modes"), and various operational states (see column "States"). Strictly as an example (and as shown) the server identified as "Server01" has an entry showing a connection to a database instance identified as "Client01", and this connection is referred to using a connection logical unit identifier "$C_{A1}$". Further, a set of locks, respective modes, and states as are established using a connection logical unit identifier "$C_{A1}$". As shown, and as pertaining to connection logical unit identifier "$C_{A1}$", a set of locks is depicted as "{L0101DF, L0101FS} and, pertaining to connection logical unit identifier "$C_{B1}$", a set of locks is depicted as "{L0102DF}", and so on.

Locks can refer to locks or semaphores for access to particular resources, and the granularity of access locks can be highly granular. Strictly as examples, Table 1 provides a list of possible locks, together with a corresponding identifier.

TABLE 1

Lock identifiers

| Identifier/Code | Comment/Meaning |
| --- | --- |
| BL | Buffer Cache Management |
| BR | Backup/Restore |
| CF | Control File Transaction |
| CI | Cross-instance Call Invocation |
| CU | Bind Enqueue |
| DF | Datafile |
| DL | Direct Loader Index Creation |
| DM | Database Mount |
| DR | Distributed Recovery Process |
| DX | Distributed Transaction |
| FP | File Object |
| FS | File Set |
| HW | High-Water Lock |
| IN | Instance Number |
| IR | Instance Recovery |
| IS | Instance State |
| IV | Library Cache Invalidation |
| JI | Enqueue used during AJV snapshot refresh |
| JQ | Job Queue |
| KK | Redo Log "Kick" |
| KO | Multiple Object Checkpoint |
| L[A-P] | Library Cache Lock |
| LS | Log Start or Switch |
| MM | Mount Definition |
| MR | Media Recovery |
| N[A-Z] | Library Cache Pin |
| PE | ALTER SYSTEM SET PARAMETER = VALUE |
| PF | Password File |
| PI | Parallel Slaves |
| PR | Process Startup |
| PS | Parallel Slave Synchronization |
| Q[A-Z] | Row Cache |
| RO | Object Reuse |
| RT | Redo Thread |
| RW | Row Wait |
| SC | System Commit Number |
| SM | SMON |
| SN | Sequence Number |
| SQ | Sequence Number Enqueue |
| SR | Synchronized Replication |
| SS | Sort Segment |
| ST | Space Management Transaction |
| SV | Sequence Number Value |
| TA | Transaction Recovery |
| TC | Thread Checkpoint |
| TE | Extend Table |
| TM | DML Enqueue |
| TO | Temporary Table Object Enqueue |
| TS | Temporary Segment (also TableSpace) |
| TT | Temporary Table |
| TX | Transaction |
| UL | User-defined Locks |
| UN | User Name |
| US | Undo Segment, Serialization |
| WL | Being Written Redo Log |
| XA | Instance Attribute Lock |
| XI | Instance Registration Lock |

Continuing with the discussion of the sample data structure and the manner of making changes to it, any and all servers within the environment maintain a copy of this data structure. Ongoing updates to the data structure are communicated between servers (e.g., using a broadcast channel), and all copies of the data structure are substantially identical at any moment in time. The sample data structure 3A00 shows four connections owned by Server01 (e.g., connection logical unit identifier "$C_{A1}$", connection logical unit identifier "$C_{B1}$", connection logical unit identifier "$C_{D1}$", and connection logical unit identifier "$C_{E1}$"), and one connection owned by Server02 (e.g., connection logical unit identifier "$C_{C2}$").

In the event that "Server01" is deemed to have failed, then the connections owned by Server01 are deemed to have failed along with the failed server, and the locks/modes and states become the subject of bring-up operations, which bring-up operations include bringing-up new connections on a failover target.

Changes to the data structure to reflect bring-up and reconstruction operations (including new entries to represent new connections and reclaimed locks/modes and newly-updated states as pertaining to corresponding instances in the failover target) are now discussed.

Figure 3B:
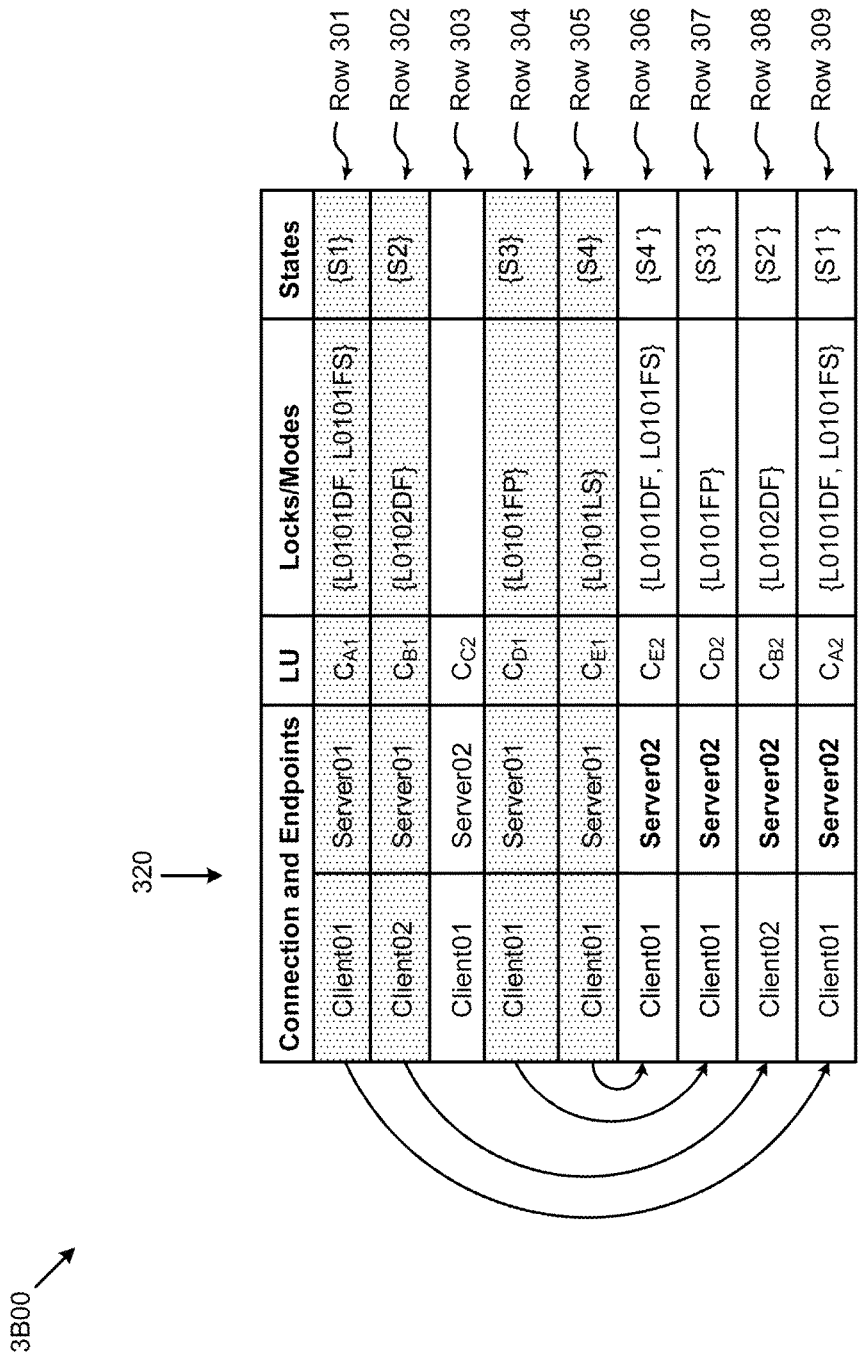
FIG. 3B depicts a sample data structure showing reconstruction during bring-up as used in systems for retaining and reclaiming resource locks and client states after one or more server failures, according to some embodiments.

FIG. 3B depicts a sample data structure 3B00 showing reconstruction during bring-up as used in systems for retaining and reclaiming resource locks and client states after one or more server failures. As an option, the present data structure 3B00 may be implemented in the context of the architecture and functionality of the embodiments described herein. Also, the data structure 3B00 or any aspect therein may be implemented in any desired environment.

The depiction of sample data structure 3B00 includes entries (e.g., row 301, row 302, . . . row 309). The entries given in row 301, row 302, row 304, and row 305 depict the entries that pertain to Server01 (see the endpoints columns 320). The entries given in row 303 depict an entry that pertains to Server02. When Server01 is deemed to have failed, and another server is identified as the failover target, the sample data structure 3B00 is modified as follows:

The entries are marked for reclamation (see the rows having a stippled pattern, namely row 301, row 302, row 304, and row 305).

Steps to reclaim aspects of the marked rows are initiated. In some embodiments, the entries are marked for reclamation and reproduced as new entries (namely row 306, row 307, row 308, and row 309).

The failover target server (in this example, "Server02") begins a process to reestablish connections and to refresh the status of locks/modes and states. As show, "Server02" picks up the marked rows and takes ownership for the connections (e.g., see the emboldened indications of "Server02").

New connections are established, and correspondingly new connection logical unit identifiers are established and recorded (e.g., see "$C_{E2}$", "$C_{D2}$", "$C_{B2}$" and "$C_{A2}$").

Locks, their status, and modes are renewed, refreshed or deallocated.

Operational states are updated to reflect the then current operational states.

The user applications that were formerly relying on "Server01" are now able to rely on "Server02". The transition is seamless, at least to the extent that the user applications need not be made aware of the failure of "Server01", and need not be aware of failover to "Server02".

The foregoing is merely one possible example scenario, and other scenarios and/or sequence of operations for failover and bring-up are possible, some of which scenarios are discussed in the following FIG. 4 and FIG. 5.

Figure 4:
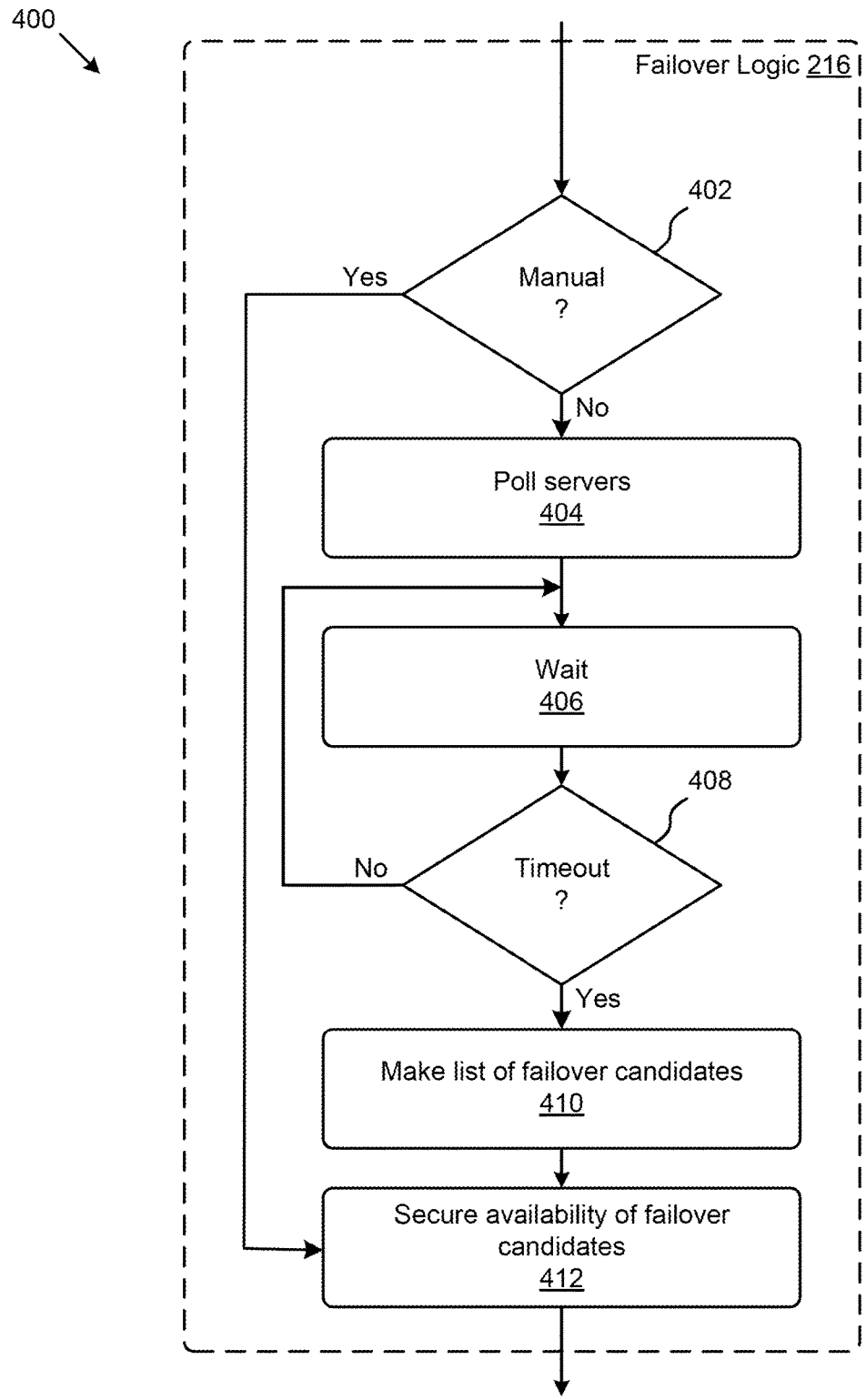
FIG. 4 shows a sample sequence of operations for failover as used in systems for retaining and reclaiming resource locks and client states after one or more server failures, according to some embodiments.

FIG. 4 shows a sample sequence 400 of operations for failover as used in systems for retaining and reclaiming resource locks and client states after one or more server failures. As an option, the present sample sequence 400 may be implemented in the context of the architecture and functionality of the embodiments described herein. Also, the sample sequence 400 or any aspect therein may be implemented in any desired environment.

One aspect of failover logic is to determine which server or servers are available as a failover candidate (also refer to operation 220 of FIG. 2). In this example, a set of servers are polled (see operation 404) and sample sequence 400 waits for assembly of all of the polling results (see operation 406). In some cases waiting for assembly of the polling results is repeated until a timeout threshold is reached (see decision 408). Given the results of the polling (e.g., some or all of the polled servers return a healthy indication), then a set of failover candidates can be compiled (see operation 410). Yet, this is merely a set of failover candidates, and in some cases there are multiple servers in the set of failover candidates such that an additional operation might be performed so as to identify and select one failover target from among the set of failover candidates (see operation 412).

Once the availability of one or more failover targets has been identified, certain operations for bring-up commence. A set of sample bring-up operations are discussed infra.

It sometimes occurs that a particular server is purposely selected to be a failover target, and in such a case (e.g., see decision 402) the list of failover candidates comprises the one particular server that was purposely selected to be the failover target.

Figure 5:
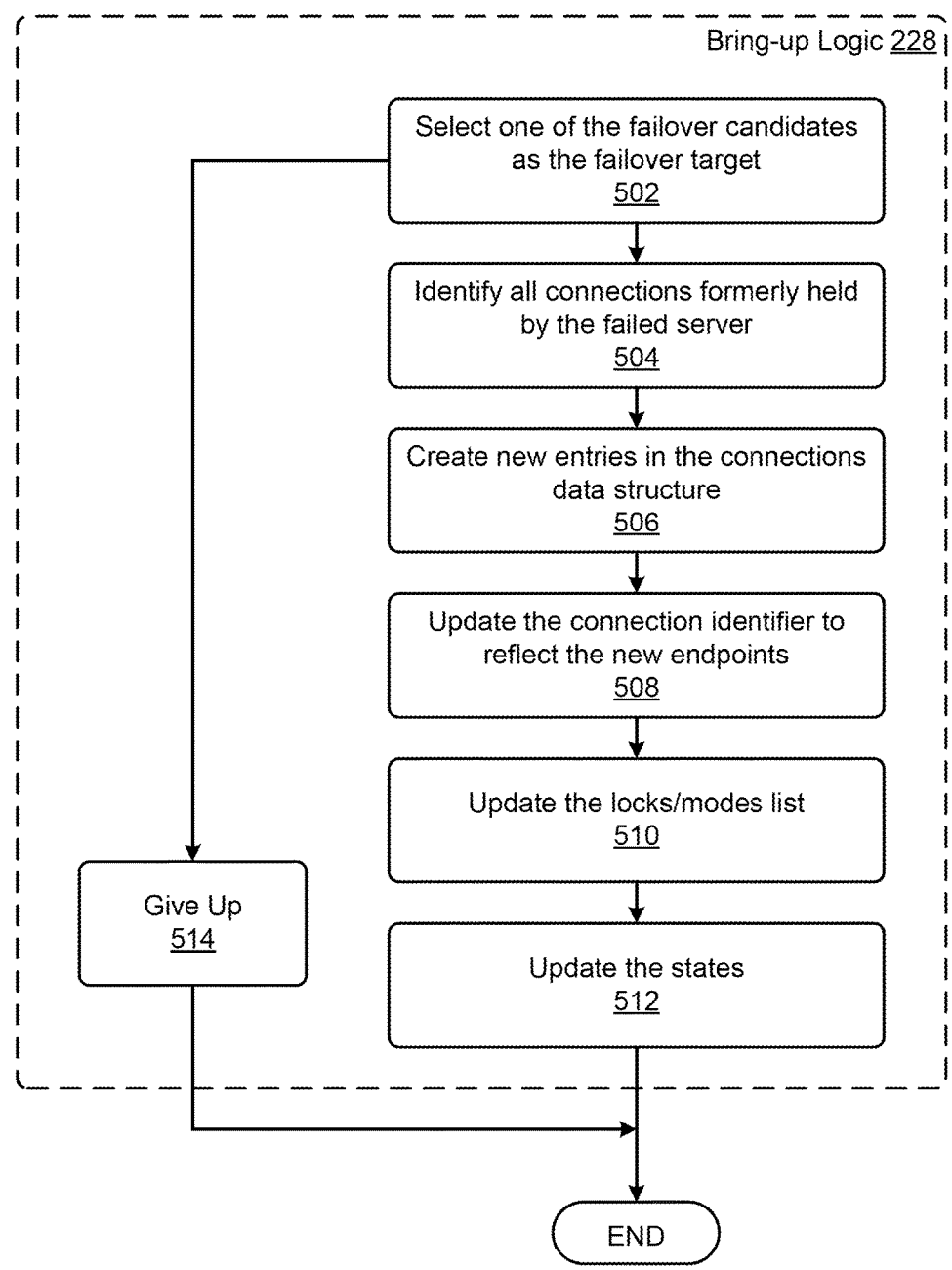
FIG. 5 shows a sample sequence of operations for bring-up as used in systems for retaining and reclaiming resource locks and client states after one or more server failures, according to some embodiments.

FIG. 5 shows a sample sequence 500 of operations for bring-up as used in systems for retaining and reclaiming resource locks and client states after one or more server failures. As an option, the present sample sequence 500 may be implemented in the context of the architecture and functionality of the embodiments described herein. Also, the sample sequence 500 or any aspect therein may be implemented in any desired environment.

In some situations, all servers in the set of failover candidates might be identical or indistinct as for purposes of selecting a failover target, and more than one server in the set of failover candidates might be available as a failover candidate (refer to operation 412). In other situations, a single failover target can be selected based on considerations such as a hardware or software configuration, or based on a reported load. For example, if the failed server required a direct connection to a WAN, but only some of the failover candidates are configured with a direct connection to a WAN, then only those might be further considered as a failover candidate. Or, in another situation, multiple failover candidates might be appropriately configured, yet some of those are heavily loaded and some are lightly loaded. In such a case, a final failover target might be selected based on the reported light load. Other selection criteria are reasonable and possible, and the operation to select one of the failover candidates as the failover target (see operation 502) is illustrative of the result of the operation.

The shown bring-up logic 228 continues to identify the connections formerly held by the failed server (see operation 504). Again referring to the data structure of FIG. 3B, the entries corresponding to the failed server are identified (see operation 504) and noted or marked for reclamation. Then, the bring-up logic creates new entries in the data structure in order to reclaim aspects of the resources identified in the marked entries. In some embodiments, the entries marked for reclamation are reproduced as new entries (see operation 506). The reclamation process can include updating the connections with a new connection logical unit number and updating the connections with a new endpoint. In this example, "Server02" replaces the endpoint of the failed server "Server01" (see operation 508).

Having accomplished at least a portion of updating the connections with a new connection logical unit number and updating the connections with a new endpoint, communication with the failover target server and any connected computational units can proceed. In this example, "Server02" begins a process to update/refresh the status of locks/modes (see operation 510) and states (see operation 512).

Operation 514 depicts the situation where the operation to select one of the failover candidates as the failover target (see operation 502) fails to select any suitable failover target, and the bring-up logic 228 reports a "Give Up" indication to the caller.

In some cases locks, their status, and modes are refreshed or deallocated, and in the course of doing so, some locks may have expired (e.g., and may need to be refreshed or deallocated), and some locks may need to be revoked. In exemplary cases, any individual server is able to detect an expired or stale nature of a privilege or lock and at least to that extent can clean up its data structures independently from other servers.

Additional Embodiments Of The Disclosure

Figure 6:
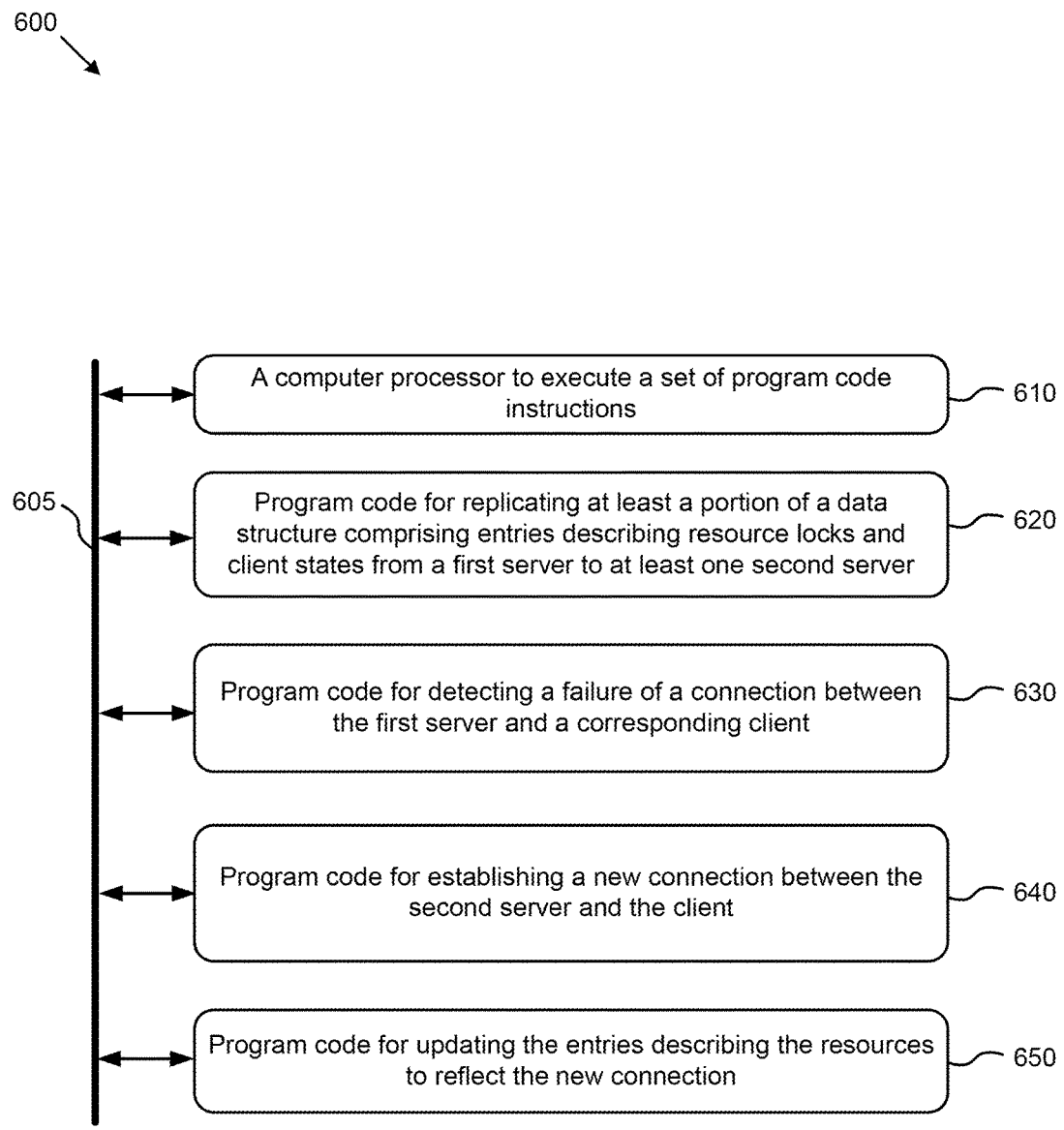
FIG. 6 is a block diagram of a system for retaining and reclaiming resource locks and client states after one or more server failures, according to some embodiments.

FIG. 6 is a block diagram of a system for retaining and reclaiming resource locks and client states after one or more server failures. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: replicating at least a portion of a data structure comprising entries describing resource locks and client states from a first server to at least one second server (see module 620); detecting a failure of a connection between the first server and a corresponding client (see module 630); establishing a new connection between the second server and the client (see module 640); and updating the entries describing the resources to reflect the new connection (see module 650).

System Architecture Overview

Figure 7:
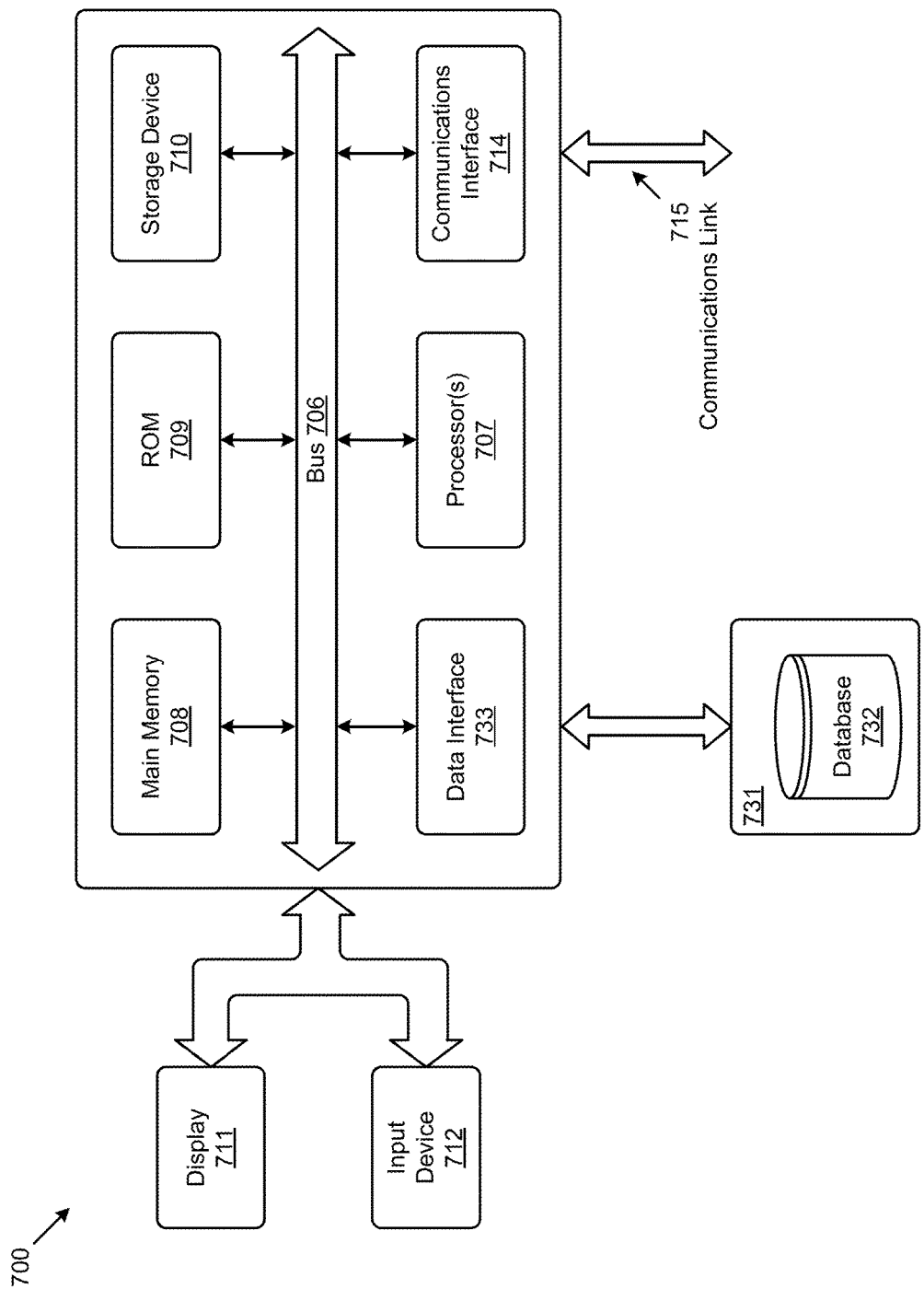
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for retaining and reclaiming resource locks comprising:

identifying a group of servers managing shared resources and comprising a first server and a plurality of remaining servers;

identifying a broadcast channel that connects servers in the group of servers with one another;

identifying a first set of information stored in a first copy of a same data structure on the first server and a plurality of a second sets of information stored in a plurality of second copies of the same data structure respectively stored on the plurality of remaining servers, the same data structure comprising information about states and resource locks that pertain to the shared resources and are acquired by respective clients in communication with the group of servers;

maintaining the same data structure on at least the first server and the plurality of remaining servers at least by:

the first server broadcasting first updates in the first set of information to the plurality of remaining servers while receiving second updates in the plurality of second sets of information from the plurality of remaining servers and storing the second updates into the first copy of the same data structure on the first server, via the broadcast channel connecting the group of servers with each other; and the plurality of remaining servers respectively broadcasting the second updates to each other and to the first server while respectively receiving the first updates from the first server and at least some second updates from one or more remaining servers of the plurality of remaining servers and storing the first updates and the at least some second updates into respective second copies of the same data structure on the plurality of remaining servers, via the broadcast channel;

detecting a failure affecting a connection between the first server and a database corresponding to a client while one or more operations for the client continue operating on the database after the failure has occurred;

identifying one or more changes in one or more existing resource locks for the client caused by an execution of the one or more operations after the failure has occurred and before a new connection is established for the client;

establishing a new connection or a new session between a remaining server of the plurality of remaining servers and the database corresponding to the client at least by creating the new connection or the new session at the remaining server using a second copy of the same data structure on the remaining server, rather than relying on the client to establish the new connection or the new session; and updating a second set of information in the second copy to include description of the new connection or the new session as well as information pertaining to the one or more changes after the failure of the connection.

2. The method of claim 1, further comprising:

replacing the first server in the group with a remaining server of the plurality of remaining servers at least by performing a reconstruction process, the reconstruction process comprising:

the remaining server identifying one or more existing entries that pertain to at least one existing resource lock held by the first server for the client from the second copy on the remaining server.

3. The method of claim 2, wherein the reconstruction process comprises:
   identifying the information about the states and resource locks stored on the first server and pertaining to connections and a plurality of shared resource locks that include the one or more existing resource lock for the client in communication with the first server prior to the failure;
   reconstructing the information about the states that is stored in the first copy on the first server on a remaining server;
   re-associating the information about the states and resource locks stored on the remaining server with the client, the reconstruction process further comprising:
      the remaining server adding one or more new entries that respectively correspond to the one or more existing entries pertaining to the at least one existing resource lock into the second copy on the remaining server, wherein the one or more new entries comprise at least one of an identifier, a mode, or a status of the at least one existing resource lock.

4. The method of claim 3, wherein at least one client state of one or more client states comprises a connection state, and the reconstruction process further comprising:
   the remaining server acquiring ownership of the at least one existing resource lock for the client and updating the one or more new entries with ownership information of the ownership and at least one new logical unit identifier for the at least one resource lock.

5. The method of claim 4, wherein the client includes a database instance of the database, a detection of the failure of the connection between the first server and the client is performed by the client or a server in the group, or the first server the plurality of remaining servers form a cluster of servers, and the reconstruction process further comprising:
   the remaining server updating the second copy with operational state information of the at least one existing resource lock based at least in part upon the execution of the one or more operations on the database.

6. The method of claim 1, further comprising:
   replicating the same data structure onto a plurality of servers in the group at least by the first server broadcasting the first set of information to a plurality of second servers while receiving and storing respective second sets of information broadcast from the plurality of second servers into the first copy of the same data structure on the first server; and
   replicating the same data structure onto servers in the group at least by the plurality of second server broadcasting the respective second sets of information to the first server while receiving and storing the first set of information broadcast from the first server into respective second copies of the same data structure, and while the first server is broadcasting the first set of information to the plurality of second servers in the group of servers to replicate the same data structure onto the first server and the plurality of second servers in the group.

7. The method of claim 1, further comprising:
   migrating the one or more resource locks allocated to the client by the first server for the client from the first server to the selected second server for the new connection.

8. The method of claim 7, further comprising:
   allocating an additional resource lock for the one or more operations for the client; migrating one or more lock states corresponding to the one or more resources locks from the first server to the selected second server; and deallocating, at the selected second server, at least one resource lock of the one or more resource locks that are allocated to the user by the first server.

9. A computer system for retaining and reclaiming resource locks comprising:
   a group of servers managing shared resources and comprising a first server and a plurality of remaining servers, each of the first server and the plurality of remaining servers hosting a respective copy of a same data structure, and the same data structure comprising information about states and resource locks pertaining to the shared resources and acquired by respective clients in communication with the group of servers;
   a communication channel that is configured to connect the each server in the group of servers to one another;
   failover logic that is operatively coupled to the broadcast channel and is configured to:
      identify a first set of information stored in a first copy of the same data structure stored on the first server and a plurality of second sets of information of the same data structure respectively stored in a plurality of second copies of the same data structure on the plurality of remaining servers;
      maintain the same data structure on at least the first server and the plurality of remaining servers at least by:
         the first server configured to broadcast first updates in the first set of information to the plurality of second servers while receiving second updates in the plurality of second sets of information from the plurality of remaining servers and storing into the first copy of the same data structure on the first server; and
         the plurality of remaining server configured to respectively broadcast the second updates to each other and to the first server while respectively receiving the first updates from the first server and at least some second updates from one or more remaining servers of the plurality of remaining servers and storing the first updates and the at least some second updates into respective second copies of the same data structure on the plurality of remaining servers, via the broadcast channel;
      detect a failure affecting a connection between the first server and a database corresponding to a client while one or more operations for the client continue operating on the database after the failure has occurred;
      identify one or more changes in one or more existing resource locks for the client caused by an execution of the one or more operations after the failure has occurred and before a new connection is established for the client;
   a physical network component configured to establish a new connection or a new session a remaining server of the plurality of remaining servers and the database corresponding to the client at least by creating the new connection or the new session at the remaining server using a second copy of the same data structure on the remaining server, rather than relying on the client to establish the new connection or the new session;
   the remaining server configured to update a second set of information in the second copy to include description of the new connection and information pertaining to the one or more changes after the failure of the connection.

10. The computer system of claim 9, wherein the client comprises a database instance, and the broadcast channel is implemented on the physical network component.

11. The computer system of claim 9, establishing the new connection or the new session comprising performing a reconstruction process, and the reconstruction processing comprising:

the remaining server identifying one or more existing entries that pertain to at least one existing resource lock held by the first server for the client from the second copy on the remaining server.

12. The computer system of claim 11, wherein the states comprises a connection state, and the reconstruction process further comprises:

the remaining server adding one or more new entries that respectively correspond to the one or more existing entries pertaining to the at least one existing resource lock into the second copy on the remaining server, wherein the one or more new entries comprise at least one of an identifier, a mode, or a status of the at least one existing resource lock.

13. The computer system of claim 12, wherein the first server and the plurality of remaining servers form a cluster of servers, the failover logic is implemented within a database instance, or the failover logic is implemented within the first server or at least one remaining server of the plurality of remaining servers, and the reconstruction process further comprising:

the remaining server acquiring ownership of the at least one existing resource lock for the client and updating the one or more new entries with ownership information of the ownership and at least one new logical unit identifier for the at least one resource lock.

14. The computer system of claim 9, wherein the failover logic, the broadcast channel, and the physical network component are further configured to migrate one or more resource locks allocated to the client by the first server for the client from the first server to the remaining server for the new connection, and the reconstruction process further comprises:

the remaining server updating the second copy with operational state information of the at least one existing resource lock based at least in part upon the execution of the one or more operations on the database.

15. The computer system of claim 9, wherein the failover logic, the broadcast channel, and the physical network component are further configured to migrate one or more lock states corresponding to one or more resources locks from the first server to the second server; and deallocate, at the second server, at least one resource lock of the one or more resource locks that are allocated to the user by the first server.

16. The computer system of claim 9, wherein the broadcast channel sends updated entries comprising a renewed lock.

17. A computer program product embodied in a non-transitory computer readable medium, the computer readable medium having stored thereon a sequence of instructions which, when executed by a processor causes the processor to execute a set of acts for retaining and reclaiming resource locks, the set of acts comprising:

identifying a group of servers managing shared resources and comprising a first server and a plurality of remaining servers;

identifying a broadcast channel that connects servers in the group of servers with one another;

identifying a first set of information stored in a first copy of a same data structure on the first server and a plurality of second sets of information stored in a plurality of second copies of the same data structure respectively stored on the plurality of remaining servers, the same data structure comprising information about states and resource locks that pertain to the shared resources and are acquired by respective clients in communication with the group of servers;

maintaining the same data structure on at least the first server and the plurality of remaining servers at least by:

the first server broadcasting first updates in the first set of information to the plurality of remaining servers while receiving second updates in the plurality of second sets of information from the plurality of remaining servers and storing the second updates into the first copy of the same data structure on the first server, via the broadcast channel connecting the group of servers with each other; and the plurality of remaining servers respectively broadcasting the second updates to each other and to the first server while respectively receiving the first updates from the first server and at least some second updates from one or more remaining servers of the plurality of remaining servers and storing the first updates and the at least some second updates into respective second copies of the same data structure on the plurality of remaining servers, via the broadcast channel;

detecting a failure affecting a connection between the first server and a database corresponding to a client while one or more operations for the client continue operating on the database after the failure has occurred;

identifying one or more changes in one or more existing resource locks for the client caused by an execution of the one or more operations after the failure has occurred and before a new connection is established for the client;

establishing a new connection or a new session between a remaining server of the plurality of remaining servers and the database corresponding to the client at least by creating the new connection or the new session at the remaining server using a second copy of the same data structure on the remaining server, rather than relying on the client to establish the new connection or the new session; and updating a second set of information in the second copy to include description of the new connection or the new session as well as information pertaining to the one or more changes after the failure of the connection.

18. The computer program product of claim 17, wherein the client comprises a database instance.

19. The computer program product of claim 17, wherein establishing the new connection or the new session comprises performing a reconstruction process that comprises:

the remaining server identifying one or more existing entries that pertain to at least one existing resource lock held by the first server for the client from the second copy on the remaining server.

20. The computer program product of claim 19, wherein the reconstruction process further comprises:

the remaining server adding one or more new entries that respectively correspond to the one or more existing entries pertaining to the at least one existing resource lock into the second copy on the remaining server, wherein the one or more new entries comprise at least one of an identifier, a mode, or a status of the at least one existing resource lock;

the remaining server acquiring ownership of the at least one existing resource lock for the client and updating the one or more new entries with ownership information of the ownership and at least one new logical unit identifier for the at least one resource lock; and the remaining server updating the second copy with operational state information of the at least one existing resource lock based at least in part upon the execution of the one or more operations on the database.

\* \* \* \* \*